(12) United States Patent
Honda et al.

(10) Patent No.: US 8,068,167 B2
(45) Date of Patent: Nov. 29, 2011

(54) SMA ACTUATOR DRIVING DEVICE, AND IMAGE PICKUP DEVICE INCORPORATED WITH THE SAME

(75) Inventors: Yasuhiro Honda, Takatsuki (JP); Yasutaka Tanimura, Nara (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 391 days.

(21) Appl. No.: 12/166,801

(22) Filed: Jul. 2, 2008

(65) Prior Publication Data

US 2009/0009656 A1 Jan. 8, 2009

(30) Foreign Application Priority Data

Jul. 5, 2007 (JP) ................................. 2007-177325

(51) Int. Cl.
G03B 13/00 (2006.01)
H04N 5/232 (2006.01)
(52) U.S. Cl. ....................................... 348/357; 396/133
(58) Field of Classification Search .................. 348/357; 396/133
See application file for complete search history.

(56) References Cited

U.S. PATENT DOCUMENTS

| | | | | |
|---|---|---|---|---|
| 3,967,227 A * | 6/1976 | Clarke et al. | ................... | 337/124 |
| 4,579,006 A * | 4/1986 | Hosoda et al. | ........... | 73/862.381 |
| 4,905,765 A * | 3/1990 | Hein | ................ | 169/61 |
| 4,977,886 A * | 12/1990 | Takehana et al. | ............. | 600/151 |
| 5,405,337 A * | 4/1995 | Maynard | ....................... | 604/531 |
| 5,459,544 A * | 10/1995 | Emura | ........................... | 396/257 |
| 5,913,871 A * | 6/1999 | Werneth et al. | ............... | 623/1.11 |
| 7,823,383 B2 * | 11/2010 | Noda et al. | ........................ | 60/528 |
| 7,953,319 B2 * | 5/2011 | Tanimura et al. | ............. | 396/133 |
| 2006/0123918 A1 * | 6/2006 | Ogisu et al. | ...................... | 73/774 |
| 2006/0150627 A1 * | 7/2006 | Oohara | ............................ | 60/528 |
| 2006/0162332 A1 * | 7/2006 | Klaffenbach et al. | ........... | 60/527 |
| 2007/0083084 A1 * | 4/2007 | Esashi et al. | .................. | 600/146 |
| 2007/0175213 A1 * | 8/2007 | Featherstone et al. | .......... | 60/527 |
| 2007/0247101 A1 * | 10/2007 | Noda et al. | ..................... | 318/582 |
| 2008/0247748 A1 * | 10/2008 | Tanimura et al. | ............. | 396/502 |
| 2008/0278030 A1 * | 11/2008 | Hara et al. | ..................... | 310/307 |
| 2008/0278590 A1 * | 11/2008 | Tanimura et al. | ........ | 348/208.99 |
| 2009/0295986 A1 * | 12/2009 | Topliss et al. | ................. | 348/374 |
| 2010/0045214 A1 * | 2/2010 | Matsuki | ........................ | 318/117 |

FOREIGN PATENT DOCUMENTS

| JP | 04-340110 A | 11/1992 |
|---|---|---|
| JP | 2006-183564 A | 7/2006 |

OTHER PUBLICATIONS

Japanese "Notice of Reasons for Rejection" dated Jun. 28, 2011, for Japanese Application No. 2007-177325, together with an English-language translation thereof.

* cited by examiner

*Primary Examiner* — Jason Chan
*Assistant Examiner* — Cynthia Calderon
(74) *Attorney, Agent, or Firm* — Sidley Austin LLP (57) ABSTRACT

In a shape memory alloy actuator driving device, a predetermined constant current is applied to a shape memory alloy member as a retrieval signal to detect a terminal voltage of the shape memory alloy member, and a detection result of the terminal voltage is compared with a target voltage value to be calculated based on a target resistance value of the shape memory alloy member and a value of the constant current to cause a driving circuit to output, to the shape memory alloy member, a drive current that makes the detection result substantially equal to the target voltage value.

6 Claims, 12 Drawing Sheets

SMA ACTUATOR DRIVING DEVICE, AND IMAGE PICKUP DEVICE INCORPORATED WITH THE SAME

This application is based on Japanese Patent Application No. 2007-177325 filed on Jul. 5, 2007, the contents of which are hereby incorporated by reference.

BACKGROUND OF THE INVENTION

1. Field of the Invention

The present invention relates to a relatively compact image pickup device to be loaded in a camera phone or a like device; and a driving device, to be incorporated in the image pickup device, for driving a lens unit constituting an image pickup optical system for focus control or zoom control.

2. Description of the Related Art

In recent years, a high-resolution image pickup device has been developed. For instance, the number of pixels of an image sensor to be loaded in a camera phone or a like device has been spectacularly increased. As the high-resolution device has been developed, a high-performance lens unit constituting an image pickup optical system has also been demanded. Specifically, a fixed focal length system is replaced by an auto-focus system. Concerning a zoom function, an optical zoom function has been demanded in place of or in addition to a digital zoom function. In view of the above trend, an actuator for moving a lens element in an optical axis direction is required both in the auto-focus system and the optical zoom system.

As an actuator, there is known a shape memory alloy (hereinafter, also called as "SMA") actuator. The SMA actuator is constructed in such a manner that a contraction force is generated by energizing and heating an SMA member, and the contraction force is used as a lens driving force. Generally, the SMA actuator is advantageous in easily reducing the size and the weight of a lens driver, and obtaining a relatively large magnitude of force.

Figure 1:
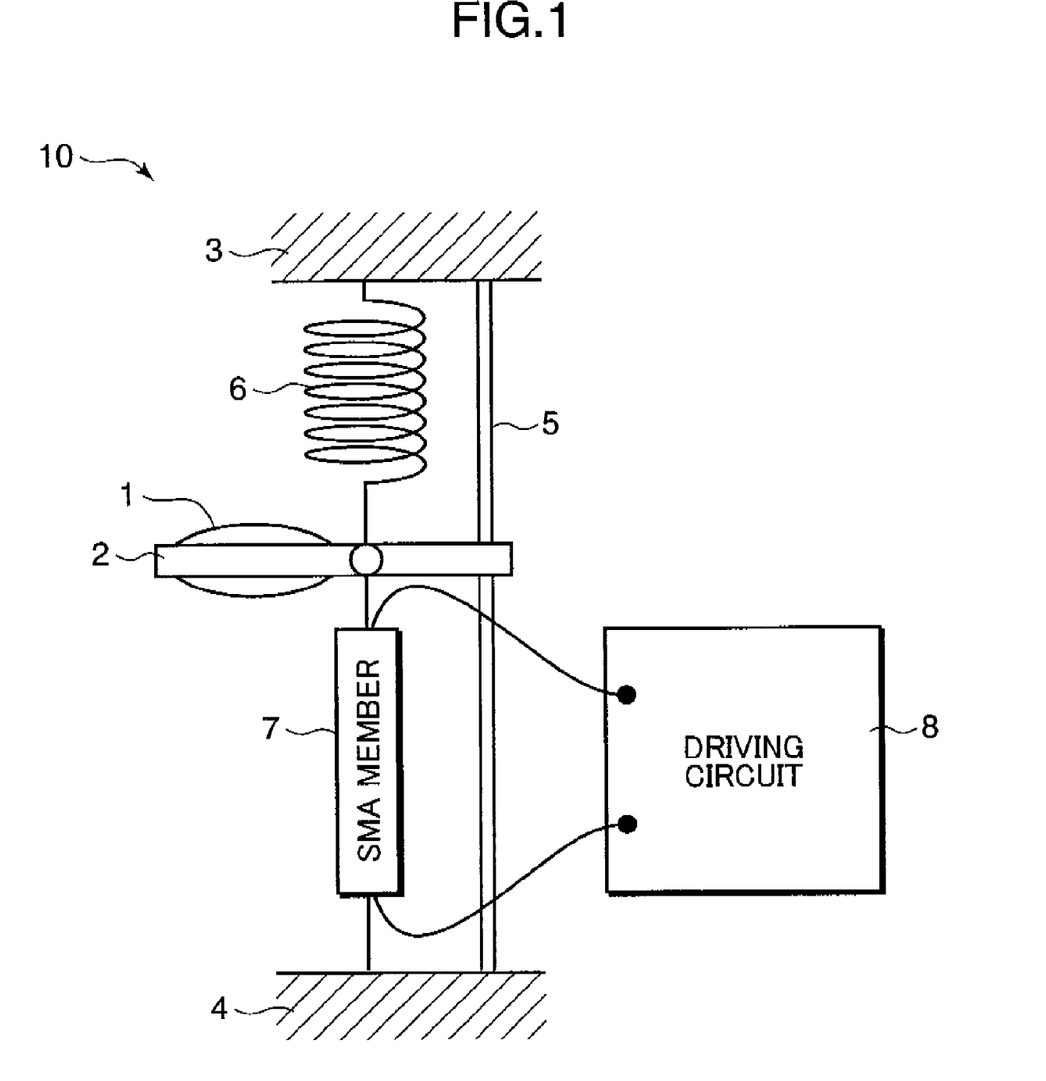
FIG. 1 is a diagram schematically showing an arrangement example of a lens unit in a mobile phone.

FIG. 1 is a diagram schematically showing an arrangement example of a lens unit 10. The lens unit 10 is constructed in such a manner that a lens barrel 2 for holding a lens element 1 is slidably movable along a guide rod 5 provided between fixing members 3 and 4. A bias spring 6 is mounted between the lens barrel 2 and the fixing member 3. A SMA member 7 is mounted between the lens barrel 2 and the fixing member 4. Both terminals of the SMA member 7 are connected to a driving circuit 8. In the case where a drive current is applied from the driving circuit 8 to the SMA member 7, or a currently applied drive current is increased to heat the SMA member 7, the SMA member 7 is contracted, thereby holding the lens barrel 2 as a driven member i.e. the lens element 1 at a position where the contraction force of the SMA member 7 is balanced with a resilient force of the bias spring 6. On the other hand, in the case where application of the drive current to the SMA member 7 is suspended, or a currently applied drive current is decreased to cool the SMA member 7, the SMA member 7 is expanded, and the lens barrel 2 i.e. the lens element 1 is held at a position balanced with the resilient force of the bias spring 6.

Figure 2:
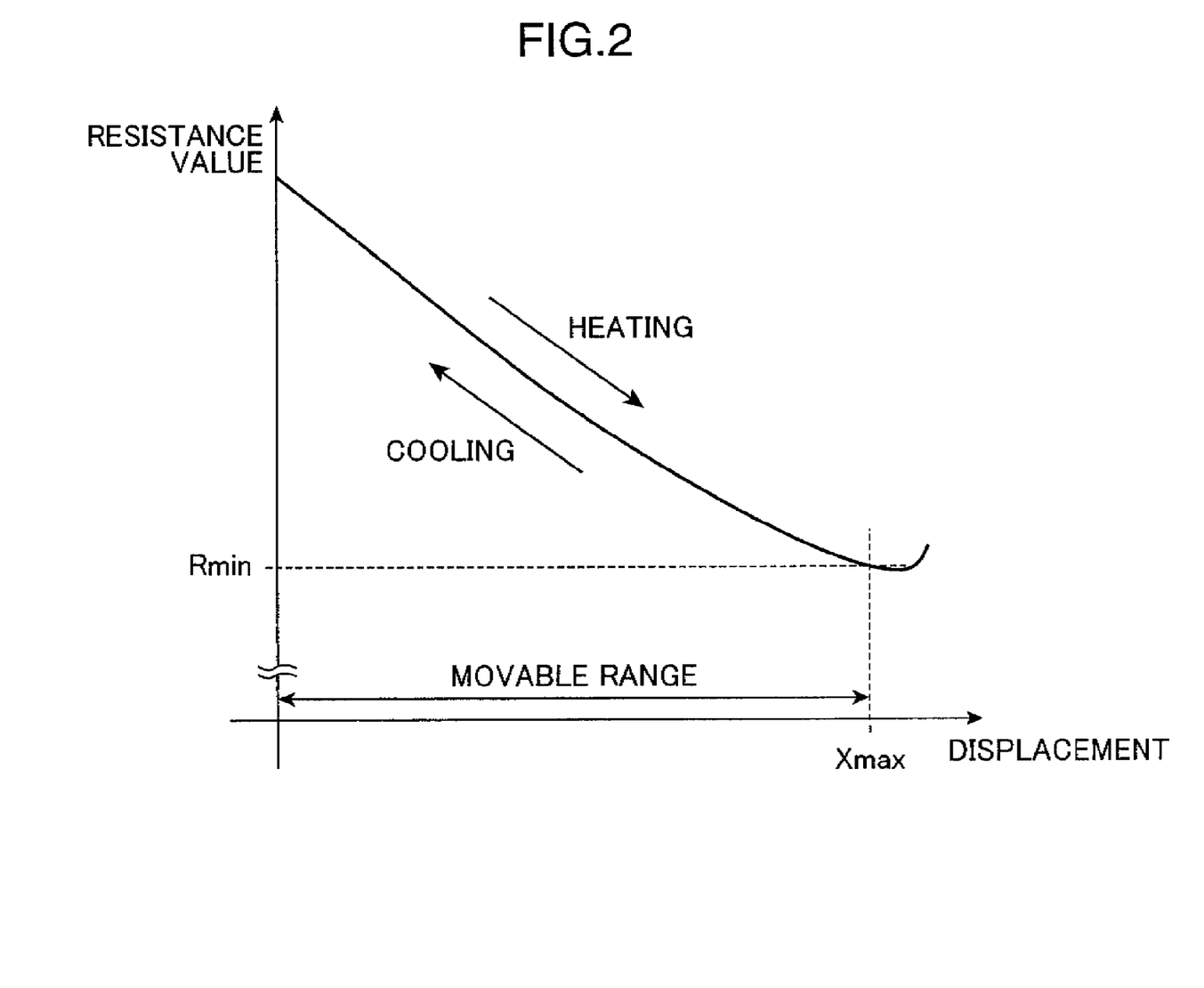
FIG. 2 is a graph showing a relation between a displacement amount of an SMA member and a resistance value of the SMA member.

In the lens unit 10 having the above arrangement, the displaced position of the lens barrel 2 i.e. the lens element 1 can be detected by measuring a resistance value of the SMA member 7. FIG. 2 is a graph showing a relation between a displacement amount of an SMA member, and a resistance value of the SMA member. As shown in FIG. 2, there is known that a resistance value of an SMA member is monotonously changed in a certain range of a displacement amount to a maximum displacement amount Xmax corresponding to a resistance value Rmin, depending on the length of the SMA member. For instance, Japanese Unexamined Patent Publication No. 2006-183564 (D1) discloses an arrangement, wherein a constant voltage is applied to a series circuit constituted of an SMA member and a resistor, and a resistance value of the SMA member is obtained based on a divided voltage thereof; or a Wheatstone bridge circuit is formed by parallel-connecting series circuits constituted of two resistors as a comparator, and a resistance value of the SMA member is obtained based on a difference between divided voltages.

In the conventional art, a resistance value of the SMA member is obtained by applying a constant voltage to the series circuit constituted of the SMA member and the resistor, and detecting a voltage at a connected point between the SMA member and the resistor. In the above arrangement, a resistor having a relatively high precision is required. In the case where an integrated circuit is fabricated, the SMA member and the resistor are externally mounted. This may increase the production cost and the size of the SMA actuator, and cause a large electric power loss by the resistor.

SUMMARY OF THE INVENTION

In view of the above conventional examples, it is an object of the present invention to provide an SMA actuator driving device suitable for fabrication of an integrated circuit and capable of suppressing an electric power loss, and an image pickup device incorporated with the SMA actuator driving device.

A shape memory alloy actuator driving device according to an aspect of the invention is constructed in such a manner that a predetermined constant current is applied to a shape memory alloy member as a retrieval signal to detect a terminal voltage of the shape memory alloy member, and a detection result of the terminal voltage is compared with a target voltage value to be calculated based on a target resistance value of the shape memory alloy member and a value of the constant current to cause a driving circuit to output, to the shape memory alloy member, a drive current that makes the detection result substantially equal to the target voltage value.

An image pickup device according to another aspect of the invention comprises the shape memory alloy actuator driving device having the above arrangement.

In the above arrangements, there is no need of providing a high-precision resistor, which is required in using e.g. a Wheatstone bridge circuit. The above arrangements enables to constitute a constant current source of a current mirror circuit or a like element, which is advantageous in fabricating an integrated circuit, and suppressing an electric power loss.

These and other objects, features and advantages of the present invention will become more apparent upon reading the following detailed description along with the accompanying drawings.

DETAILED DESCRIPTION OF THE PREFERRED EMBODIMENTS OF THE INVENTION

First Embodiment

Figure 3:
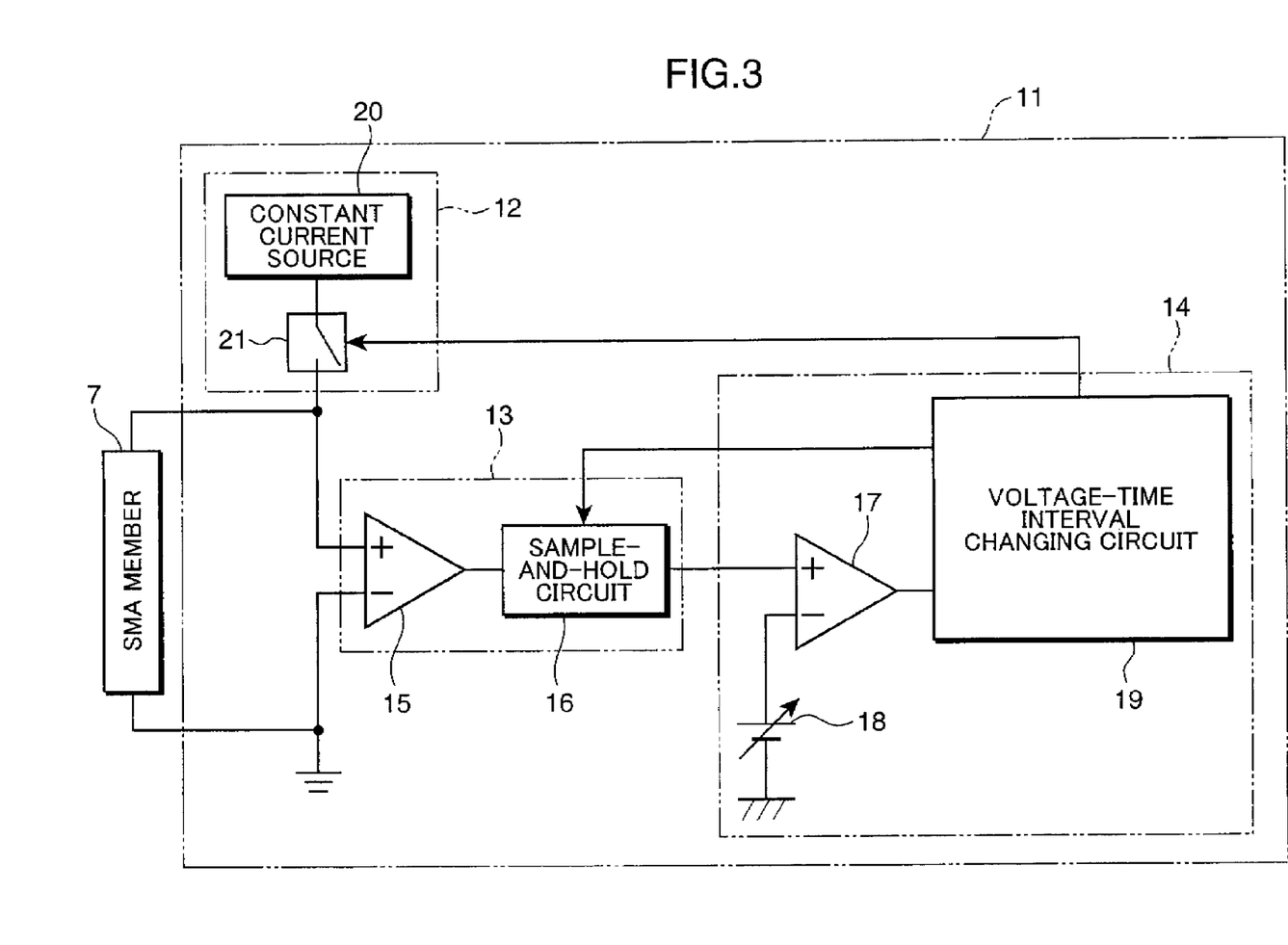
FIG. 3 is a block diagram showing an electrical configuration of an SMA actuator driving device in accordance with a first embodiment of the invention.

FIG. 3 is a block diagram showing an electrical configuration of a driving device (hereinafter, called as an "SMA actuator driving device") 11 for driving a shape memory alloy (SMA) actuator in accordance with the first embodiment of the invention. The SMA actuator driving device 11 in the first embodiment has features that: an SMA member 7 is driven by a duty-controlled constant current to be outputted from a driving circuit 12; a detecting circuit 13 is operable to detect a voltage (hereinafter, called as a "terminal voltage") between terminals of the SMA member 7 which is energized by the constant current; and a control circuit 14 controls the driving circuit 12 to perform a duty control in such a manner that the terminal voltage of the SMA member 7 is substantially equal to a target voltage value to be calculated based on a target resistance value and the value of the constant current. The SMA actuator driving device 11 is fabricated into an integrated circuit.

The detecting circuit 13 includes an operational amplifier 15 for sequentially detecting the terminal voltage of the SMA member 7, and a sample-and-hold circuit 16 for holding a detection result of the operational amplifier 15 at a timing of a trigger signal to be described later. The terminal voltage of the SMA member 7, which has been detected at the trigger signal timing, is inputted to a servo amplifier 17 in the control circuit 14 for comparison with a target voltage to be outputted from a reference voltage source 18. The target voltage is set to a voltage corresponding to a resistance value in a state that a lens element 1 as a driven member is held in an intended displaced position, in other words, the SMA member 7 is contracted or expanded to an intended length, by a focus control circuit (not shown) or a zoom control circuit (not shown). The servo amplifier 17 outputs an error signal corresponding to a difference between a hold voltage to be outputted from the sample-and-hold circuit 16, and the target voltage. A voltage-time interval changing circuit 19 outputs a time interval signal to the driving circuit 12 in response to the error signal. The driving circuit 12 includes a constant current source 20 for outputting a predetermined constant current, and a switching element 21 for turning on and off application of a constant current in response to the time interval signal.

Figure 4A:
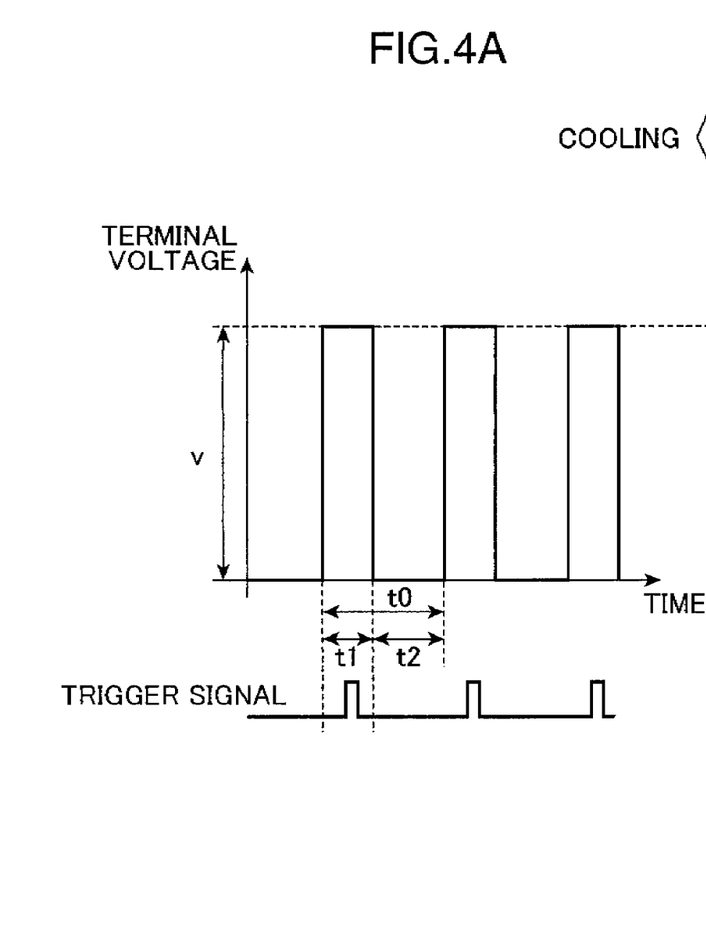
FIGS. 4A and 4B are waveform diagrams for describing an operation to be performed by the SMA actuator driving device shown in FIG. 3.
Figure 4B:
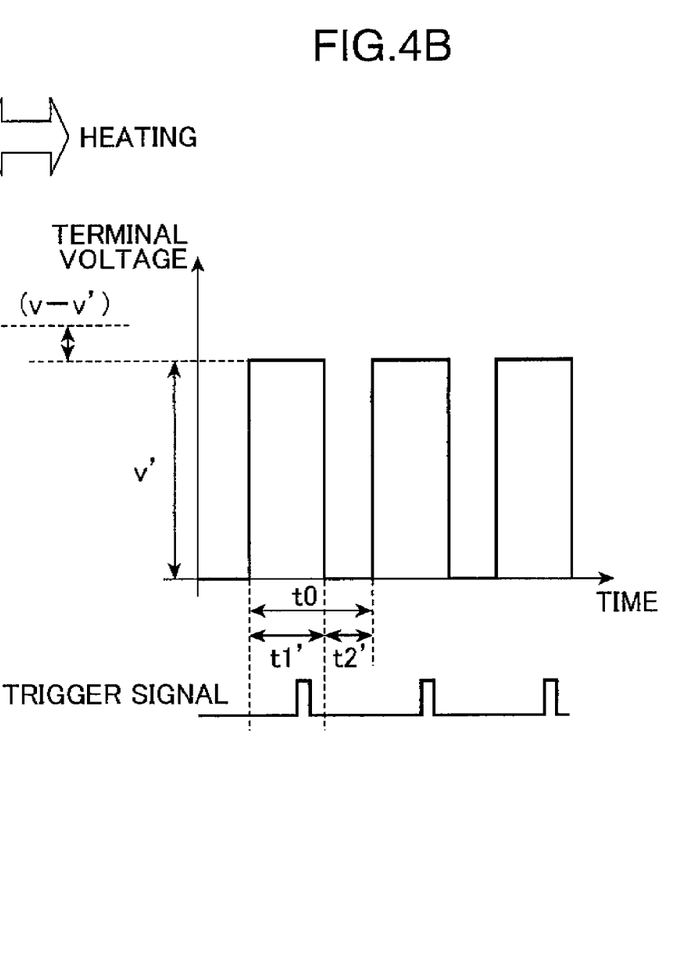

FIGS. 4A and 4B are waveform diagrams for describing an operation to be performed by the SMA actuator driving device 11 having the above arrangement. During an image pickup operation of a camera unit to be described later, the driving circuit 12 outputs a drive current for holding the lens element 1 at a predetermined position every predetermined cycle t0 e.g. 1 msec. The drive current is held at a predetermined value by the constant current source 20. The voltage-time interval changing circuit 19 controls the switching element 21 to output a drive current at a low duty cycle, as shown in FIG. 4A, in the case where the SMA member 7 is cooled by reducing the quantity of heat to be applied to the SMA member 7; and controls the switching element 21 to output a drive current at a high duty cycle, as shown in FIG. 4B, in the case where the SMA member 7 is heated. Specifically, at the low duty cycle, as shown in FIG. 4A, during a period corresponding to one cycle t0, an on-duty time t1 is shorter than an off-duty time t2. On the other hand, at the high duty cycle, as shown in FIG. 4B, during a period corresponding to one cycle t0, an on-duty time t1' is longer than an off-duty time t2'. In this way, in the case where a current switching operation is performed at a high speed, the quantity of heat to be applied to the SMA member 7 can be controlled by controlling the duty ratio: (t1/(t1+t2(=t0)), t1'/(t1'+t2')), in light of a fact that a Joule heat to be generated in the SMA member 7 is obtained by averaging with time. The quantity of heat to be applied to the SMA member 7 is controlled in such a manner that heating is performed by raising the temperature of the SMA member 7 from an ambient temperature, and cooling is performed by lowering the temperature of the SMA member 7 from the ambient temperature.

By performing the above operation, the resistance value of the SMA member 7 is increased in cooling, with the result that a voltage "v" to be detected by the operational amplifier 15 is increased. On the other hand, the resistance value of the SMA member 7 is decreased in heating, with the result that a voltage "v'" to be detected by the operational amplifier 15 is decreased. Since the period corresponding to one cycle to is short, in FIGS. 4A and 4B, the voltage "v" which is gradually increased with time, and the voltage "v'" which is gradually decreased with time are respectively indicated with substantially the same magnitude for simplifying the illustrations.

During the on-duty time t1, t1', the voltage-time interval changing circuit 19 outputs a trigger signal to the sample-and-hold circuit 16. By performing this operation, in feedback-controlling the drive current to be outputted from the driving circuit 12 by the control circuit 14, the drive current serves as a retrieval signal for measuring a resistance value of the SMA member 7. Thereby, the detecting circuit 13 enables to detect a resistance value of the SMA member 7 i.e. an expanded or a contracted length of the SMA member 7, in other words, a displaced position of the lens element 1. The on-duty time t1, t1' is set to a time longer than a time required in a sampling operation to be performed by the sample-and-hold circuit 16. The on-duty time t1, t1' can be minimized by making a start timing of the sampling operation coincident with a start timing of the on-duty time t1, t1'. In this embodiment, a retrieval signal is applied during application of a drive current.

In the above arrangement, there is no need of providing a high-precision resistor, which is required in using a Wheatstone bridge circuit, despite the need of the high-precision constant current source 20. Also, the above arrangement enables to constitute the constant current source 20 of a current mirror circuit or a like element, which is advantageous in fabricating the SMA actuator driving device 11 into an integrated circuit, as described above, and suppressing an electric power loss. Further, the driving circuit 12 for driving the SMA member 7 includes the switching element 21 for turning on and off application of an output current from the constant current source 20 to the SMA member 7. The control circuit 14 controls the duty ratio of the switching element 21, thereby displacing the SMA member 7 to an intended position. Thus, the constant current source 20 can also serve as a constant current source for outputting a retrieval signal.

Figure 5A:
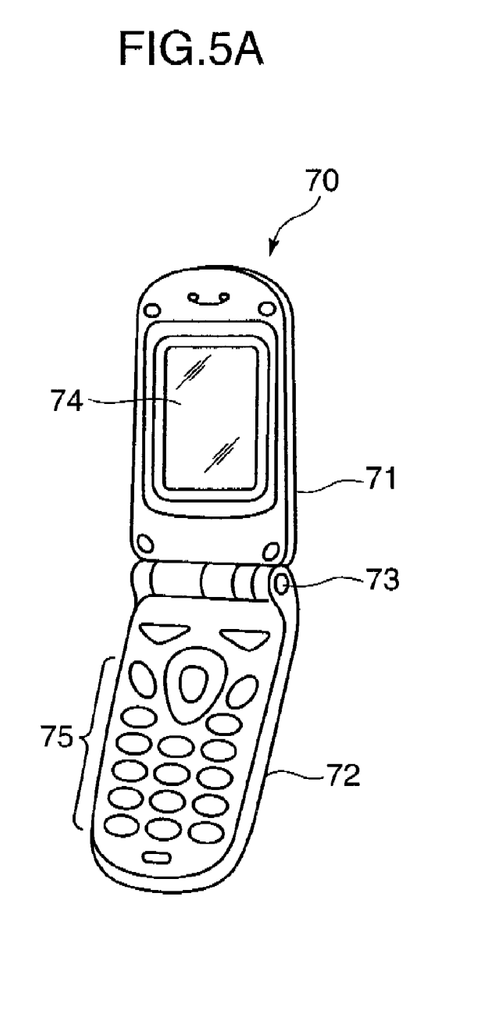
FIGS. 5A and 5B are external appearance diagrams of a camera phone incorporated with the configuration shown in FIG. 3.
Figure 5B:
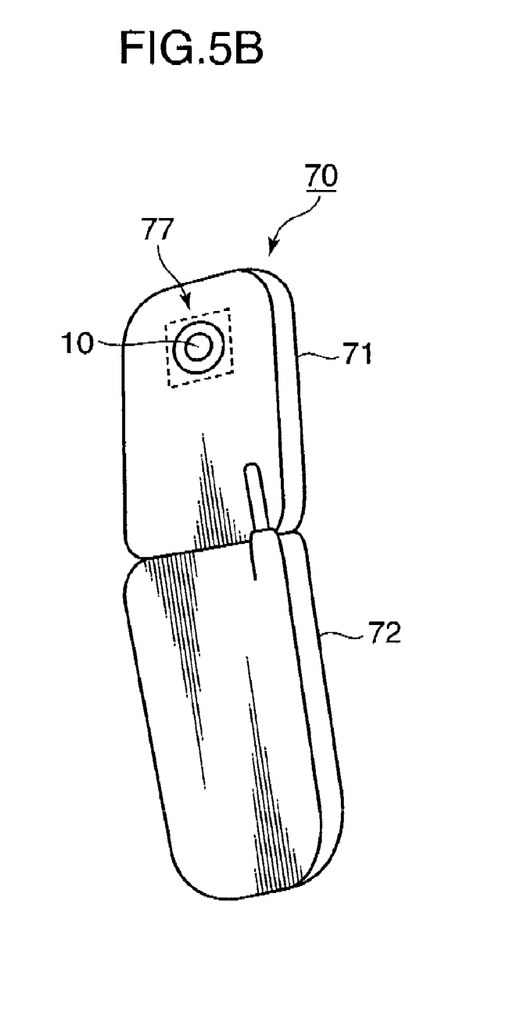

FIGS. 5A and 5B are external appearance diagrams of a camera phone 70 incorporated with a lens unit 10 (see FIG. 1), wherein the SMA actuator driving device 11 having the above arrangement is used to drive the SMA member 7. FIG. 5A shows a front surface i.e. an operation surface of the camera phone 70, and FIG. 5B shows a rear surface of the camera phone 70. The schematic mechanism of the lens unit 10 is substantially the same as that of the lens unit 10 shown in FIG. 1. As shown in FIG. 5A, the camera phone 70 has a collapsible structure, wherein a first casing 71 and a second casing 72 are interconnected by a hinge 73. An LCD (Liquid Crystal Display) 74, as a display section for displaying various information, is mounted on a front surface of the first casing 71. A key input section 75 is mounted on a front surface of the second casing 72. As shown in FIG. 5B, the camera unit 77 is built in the first casing 71 in such a manner that an objective lens of the camera unit 77 is exposed from a rear surface of the first casing 71.

The key input section 75 includes, in addition to various dial buttons for activating mobile phone functions, a mode setting button for starting up an image shooting mode, and switching over the image shooting mode between still image shooting and moving image shooting, a zoom button for controlling an optical zoom operation of the lens unit 10, and a shutter button for executing an image shooting operation.

Figure 6:
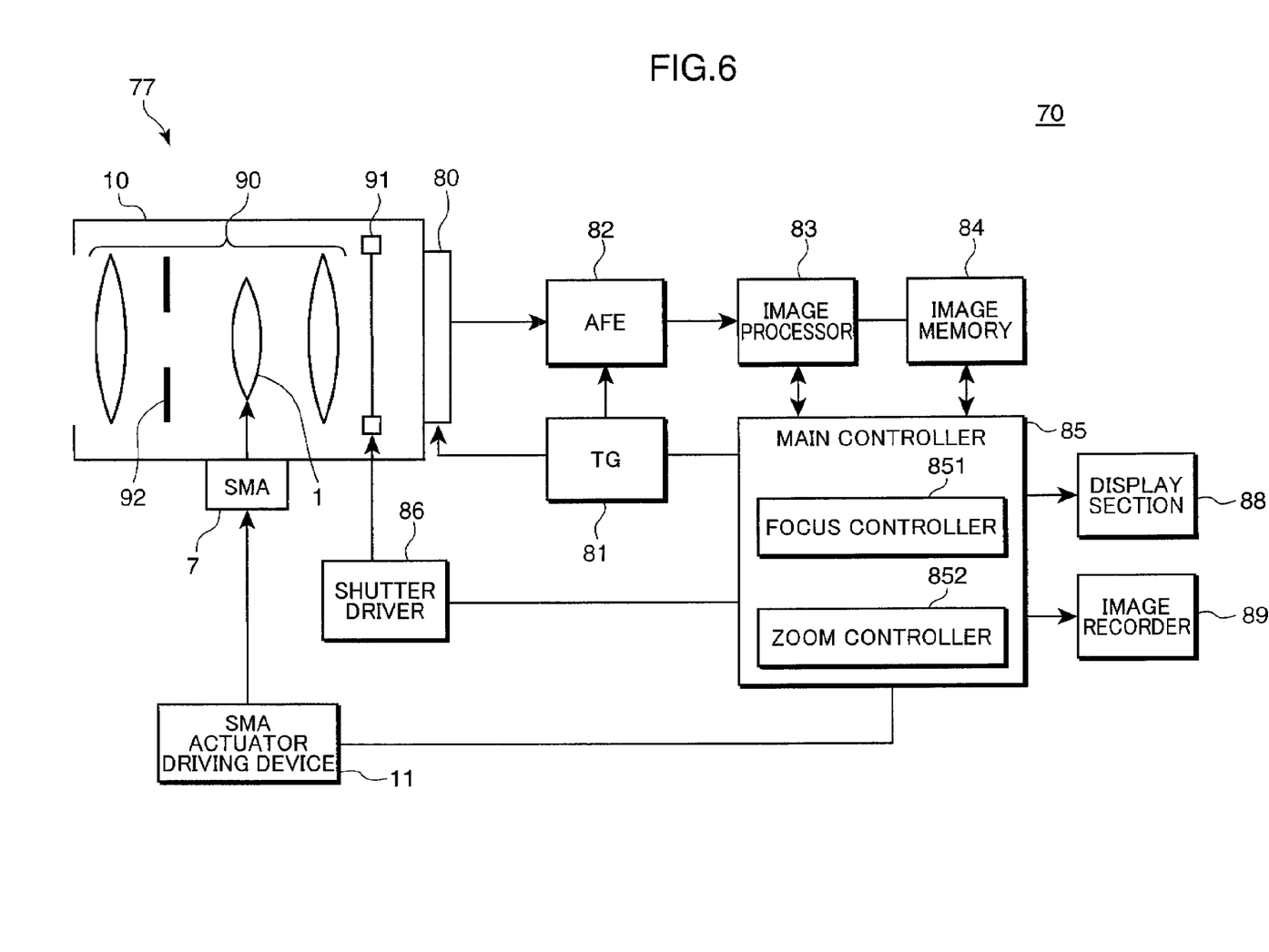
FIG. 6 is a block diagram schematically showing an electrical configuration of the camera phone.

FIG. 6 is a block diagram schematically showing an electrical configuration of the camera phone 70. The camera phone 70 includes, in addition to the camera unit 77 provided with the lens unit 10 and an image sensor 80, a timing generator (TG) 81, an analog front end (AFE) 82, an image processor 83, an image memory 84, a main controller 85, a shutter driver 86, the SMA actuator driving device 11, a display section 88, and an image recorder 89.

The lens unit 10 constitutes an image pickup optical system for picking up an optical image of a subject to guide the picked-up optical image to the image sensor 80 provided on the image side of the lens unit 10. The lens unit 10 is internally provided with a lens group 90 for forming an optical image of a subject, and a shutter 91 for blocking an optical path of the image pickup optical system or allowing light incidence. A diaphragm 92 is provided at an appropriate position in the lens group 90. The lens group 90 includes the lens element 1 for performing a focus/zoom operation. The lens element 1 is drivingly displaced in the optical axis direction by the SMA member 7 which is expanded and contracted by the SMA actuator driving device 11.

The timing generator 81 controls an image pickup operation to be performed by the image sensor 80 such as an electric charge accumulation based on exposure, or an accumulated charge readout operation. The timing generator 81 generates a predetermined timing pulse such as a vertical transfer pulse, a horizontal transfer pulse, or a charge sweep pulse, based on a reference clock to be outputted from the main controller 85; and outputs the predetermined timing pulse to the image sensor 80 to control an image pickup operation of the image sensor 80. The timing generator 81 also generates a predetermined timing pulse, and outputs the predetermined timing pulse to the analog front end 82 to control A/D conversion or a like operation.

The analog front end 82 performs predetermined signal processing with respect to an image signal to be outputted from the image sensor 80 i.e. analog signals indicating light received on the pixels of the image sensor 80 as a CCD area sensor. The analog front end 82 includes a correlation double sampling circuit for reducing reset noises included in a voltage of an analog image signal, an auto gain control circuit for correcting the level of the analog image signal, a clamp circuit for clamping a potential of black level signal, and an A/D converting circuit for converting analog image signals of R, G, and B into digital signals of e.g. 14 bits.

The image processor 83 is adapted to perform predetermined signal processing with respect to image data to be outputted from the analog front end 82 to create an image file. The image processor 83 includes a black level correcting circuit, a white balance control circuit, a color interpolation circuit, and a gamma correcting circuit. Image data inputted to the image processor 83 is temporarily written in the image memory 84 in synchronism with a readout operation from the image sensor 80. Thereafter, each time the image processor 83 accesses the image data written in the image memory 84, the respective circuits in the image processor 83 perform predetermined operations thereof.

The image memory 84 is a memory for temporarily storing image data to be outputted from the image processor 83 at the image shooting mode, and is used as a work area where the main controller 85 performs a predetermined operation with respect to the image data. The image memory 84 also temporarily stores the image data read out from the image recorder 89 at the image reproduction mode.

The main controller 85 includes a CPU (central processing unit), and is adapted to control an image shooting operation, as well as centrally controlling the parts of the camera phone 70. Specifically, the main controller 85 controls the timing generator 81, a voltage supply circuit 87, and a shutter driver 86 to perform an image shooting operation, and performs output control of image signals.

The main controller 85 functionally includes a focus controller 851 and a zoom controller 852. The focus controller 851 generates a focus control signal for moving the lens element 1 to a focus position based on predetermined metering information. The zoom controller 852 generates a zoom control signal for moving the lens element 1 for optical zooming. In this embodiment, the focus controller 851 and the zoom controller 852 constitute the reference voltage source 18. A control signal to be outputted from the focus controller 851 and the zoom controller 852 as the reference voltage source 18 is inputted to the servo amplifier 17 in the control circuit 14, as a target voltage. The shutter driver 86 drivingly opens and closes the shutter 91 in accordance with a shutter control signal to be issued from the main controller 85 to open the shutter 91 for a predetermined time.

The display section 88 corresponds to the LCD 74 shown in FIG. 5A, and is operable to display a picked-up image, a live-view image to be obtained before an image pickup operation is performed, and the like. The image recorder 89 includes a memory card, and is adapted to store image data which has undergone image processing in the image processor 83.

The camera phone 70 having the above arrangement is loaded with the lens unit 10 incorporated with the SMA member 7. The above arrangement is advantageous in providing a compact, lightweight, and impact-resistive camera phone, with a less number of parts and a less cost, which enables to secure a lens moving amount required in an autofocus operation or an optical zoom operation, and obtain high positioning precision without backlash.

Second Embodiment

Figure 7:
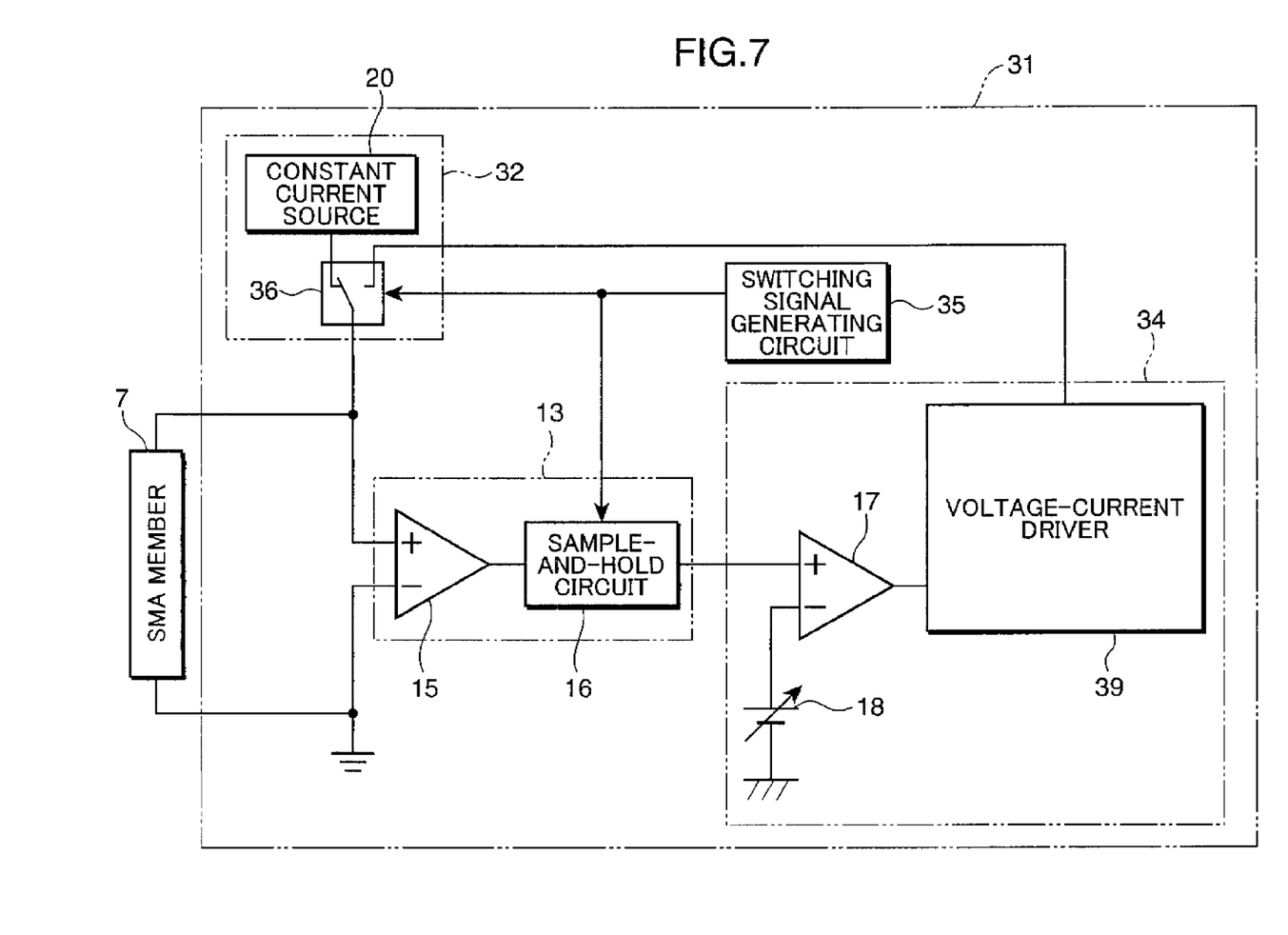
FIG. 7 is a block diagram showing an electrical configuration of an SMA actuator driving device in accordance with a second embodiment of the invention.

FIG. 7 is a block diagram showing an electrical configuration of an SMA actuator driving device 31 in accordance with the second embodiment of the invention. Elements of the SMA actuator driving device 31 substantially equivalent or corresponding to those of the SMA actuator driving device 11 are indicated with the same reference numerals, and description thereof is omitted herein. The SMA actuator driving device 31 in the second embodiment has a feature that an SMA member 7 is driven by a drive current of a variable value to be outputted from a driving circuit 32. In the above arrangement, a constant current source 20 is exclusively used for outputting a retrieval signal. The driving circuit 32 is constructed in such a manner that a switching element 36 switches over between a retrieval signal to be outputted from the constant current source 20, and a drive current to be outputted from a control circuit 34 to apply the switched current to the SMA member 7. The constant current source 20 and the control circuit 34 sequentially output a current. The switching element 36 performs a switching operation in response to a switching signal to be outputted from a switching signal generating circuit 35 as an independent element. The switching signal generated in the switching signal generating circuit 35 serves as a trigger signal to be outputted to a sample-and-hold circuit 16. In this embodiment, a retrieval signal is applied during application of a drive current. A voltage-current driver 39 in the control circuit 34 outputs a drive current of a value corresponding to an error signal to be outputted from a servo amplifier 17.

Figures 8A, 8B:
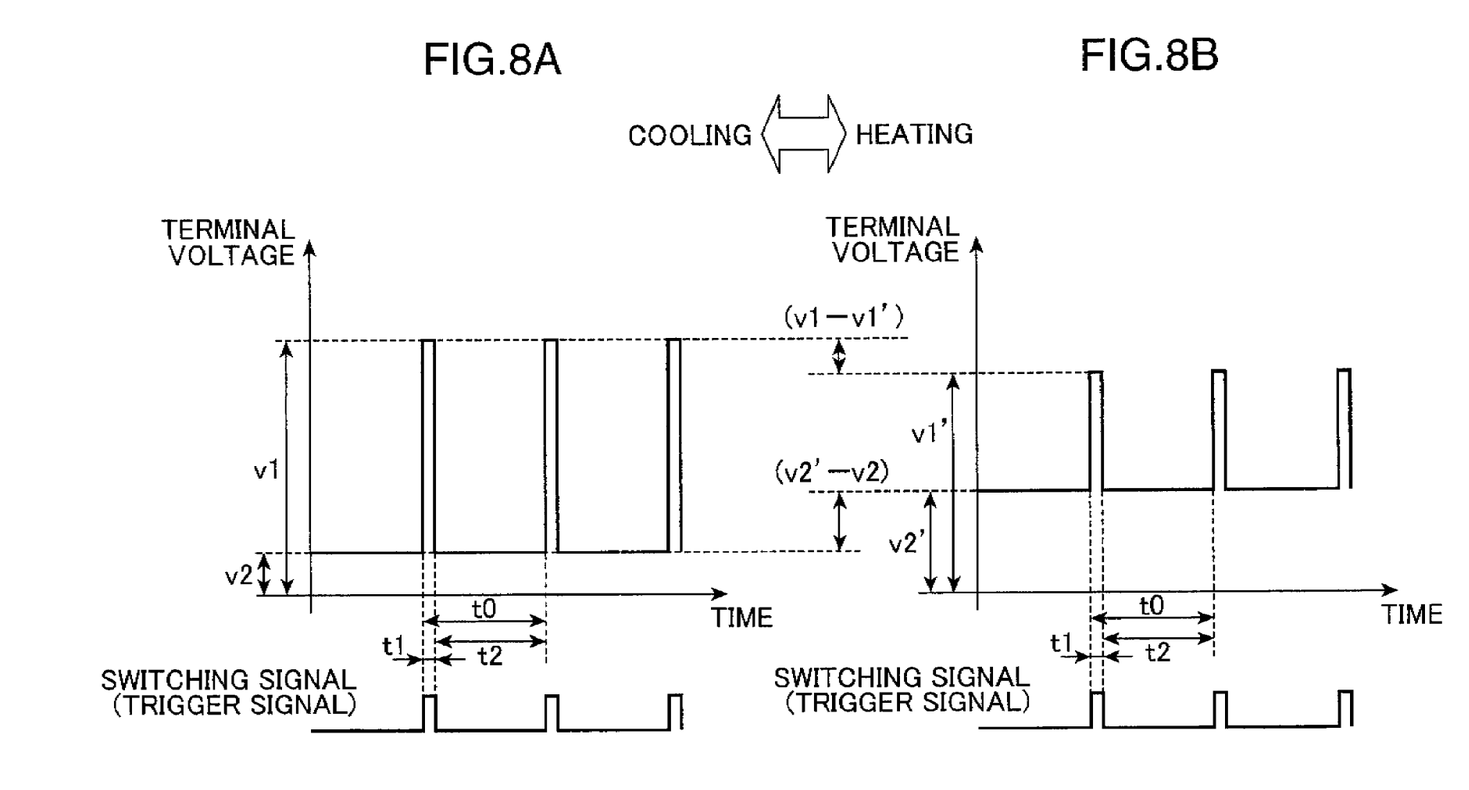
FIGS. 8A and 8B are waveform diagrams for describing an operation to be performed by the SMA actuator driving device shown in FIG. 7.

FIGS. 8A and 8B are waveform diagrams for describing an operation to be performed by the SMA actuator driving device 31 having the above arrangement. In the second embodiment, during a period of time t1 when the switching element 36 is switched to the constant current source 20, a constant current is outputted as a retrieval signal. Then, a voltage difference between a voltage v1 (see FIG. 8A) and a voltage v1' (see FIG. 8B) is generated, depending on a temperature of the SMA member 7 i.e. a resistance value of the SMA member 7. On the other hand, during a period of time t2 when the switching element 36 is switched to the voltage-current driver 39, the voltage-current driver 39 outputs a current of a small value in cooling the SMA member 7, or a current of a large value in heating the SMA member 7. By performing the above operation, as shown in FIG. 8A, a voltage v2 to be detected in cooling the SMA member 7 is low, and as shown in FIG. 8B, a voltage v2' to be detected in heating the SMA member 7 is high.

Figure 9A:
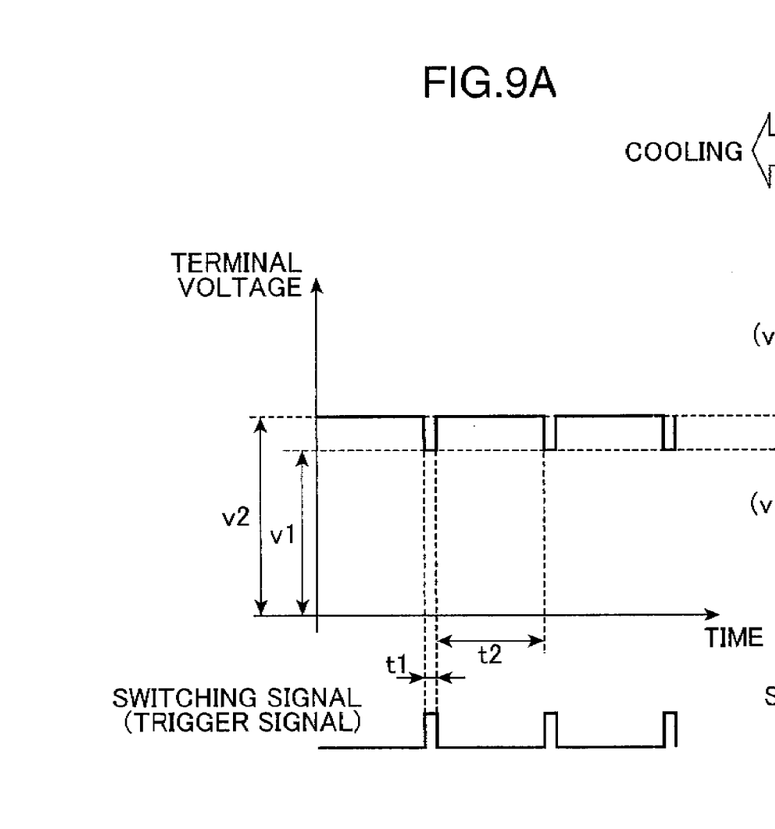
FIGS. 9A and 9B are waveform diagrams for describing an operation to be performed by the SMA actuator driving device shown in FIG. 7.
Figure 9B:
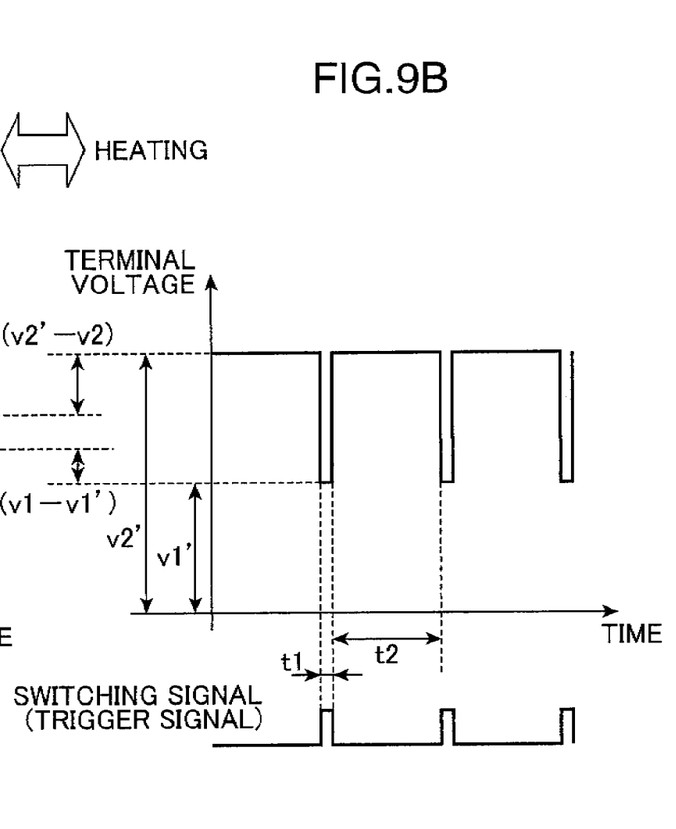

FIGS. 8A and 8B show an example, wherein a voltage conversion value based on a retrieval signal flowing from the constant current source 20 to the SMA member 7 is larger than a voltage conversion value based on a current flowing from the voltage-current driver 39 to the SMA member 7. FIGS. 9A and 9B are diagrams in the case where the magnitude relation between the voltage conversion values is opposite to the magnitude relation shown in FIGS. 8A and 8B. FIG. 9A shows a state corresponding to the state shown in FIG. 8A in cooling the SMA member 7, and FIG. 9B shows a state corresponding to the state shown in FIG. 8B in heating the SMA member 7.

As described above, controlling the constant current source 20 to output the retrieval signal at the predetermined cycle t0 and with the period of time t1 by causing the switching element 36 to cyclically perform a switching operation enables to stabilize an operation status i.e. a load status of the constant current source 20. Thereby, a terminal voltage of the SMA member 7 i.e. a resistance value thereof can be detected with high precision. Also, the above arrangement enables to minimize a time required for detecting the terminal voltage, in other words, substantially define the quantity of heat to be applied to the SMA member 7 based on the drive current by increasing the ratio of a drive current application period with respect to each cycle. This is advantageous in enhancing responsiveness of the SMA member 7. Further, the above arrangement enables to properly set a minimum value of the drive current, and allow a minute displacement of the SMA member 7. Furthermore, as compared with the duty-controlled voltage-time interval changing circuit 19, the above arrangement is advantageous in simplifying the arrangement of the current-voltage driver 39.

Third Embodiment

Figure 10:
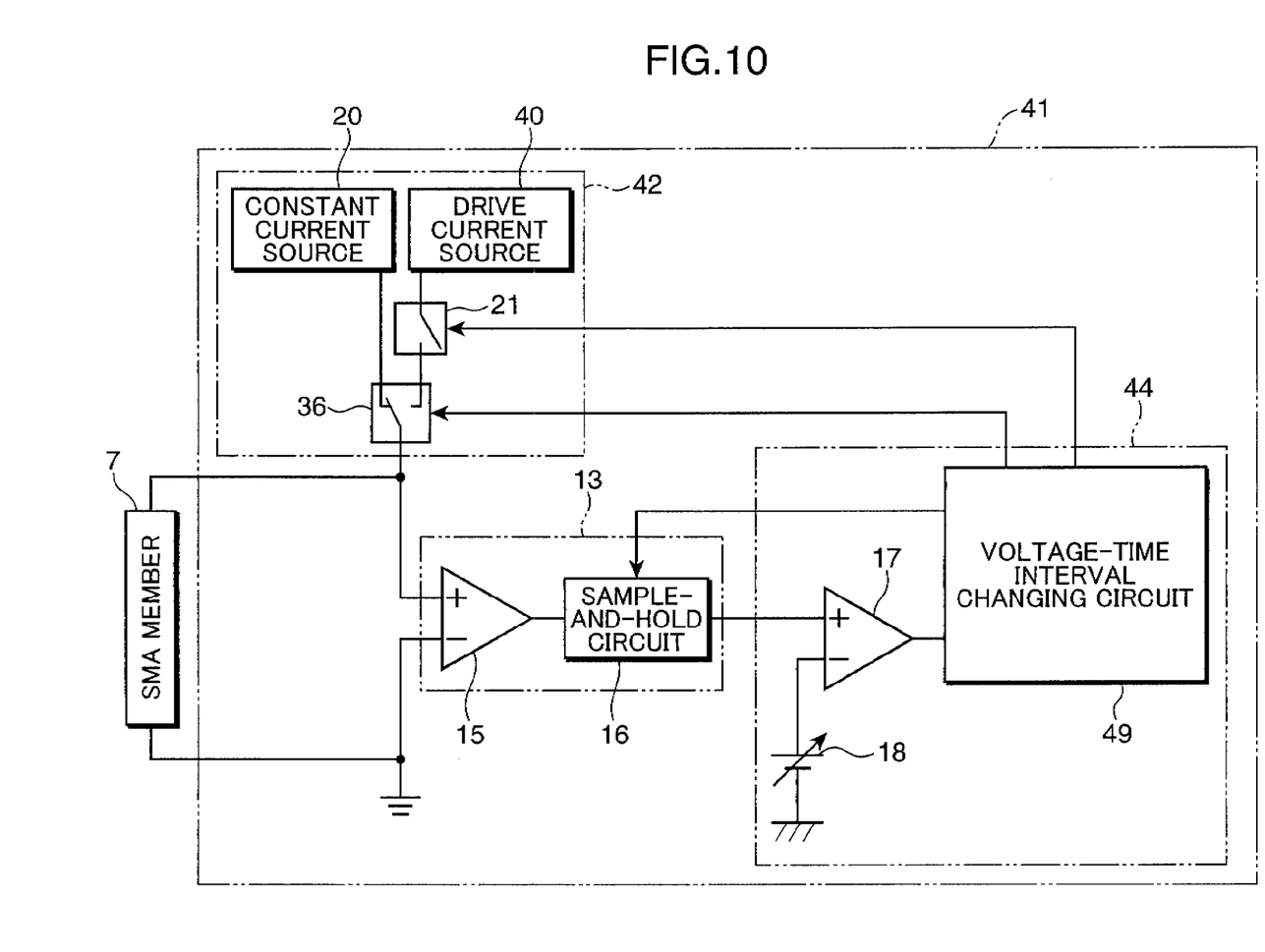
FIG. 10 is a block diagram showing an electrical configuration of an SMA actuator driving device in accordance with a third embodiment of the invention.

FIG. 10 is a block diagram showing an electrical configuration of an SMA actuator driving device 41 in accordance with the third embodiment of the invention. The arrangement of the SMA actuator driving device 41 is similar to the arrangement of the SMA actuator driving device 11, 31. Accordingly, elements of the SMA actuator driving device 41 substantially equivalent or corresponding to those of the SMA actuator driving device 11, 31 are indicated with the same reference numerals, and description thereof is omitted herein. The arrangement of the SMA actuator driving device 41 is different from the arrangement of the SMA actuator driving device 11, 31 in that a drive current to be applied from a driving circuit 42 to an SMA member 7 is switched over between a current, as a retrieval signal, to be outputted from a constant current source 20, and a current to be outputted from a drive current source 40 as an independent element, although a duty control is performed by a voltage-time interval changing circuit 49. In the above arrangement, the voltage-time interval changing circuit 49 outputs a switching signal for causing a 2-input-1-output switching element 36 to switch over between the constant current source 20 and the drive current source 40, and issues a time-interval signal to a switching element 21 for duty control. In this embodiment, a retrieval signal is applied with a drive current in a time-series manner.

Figures 11A, 11B:
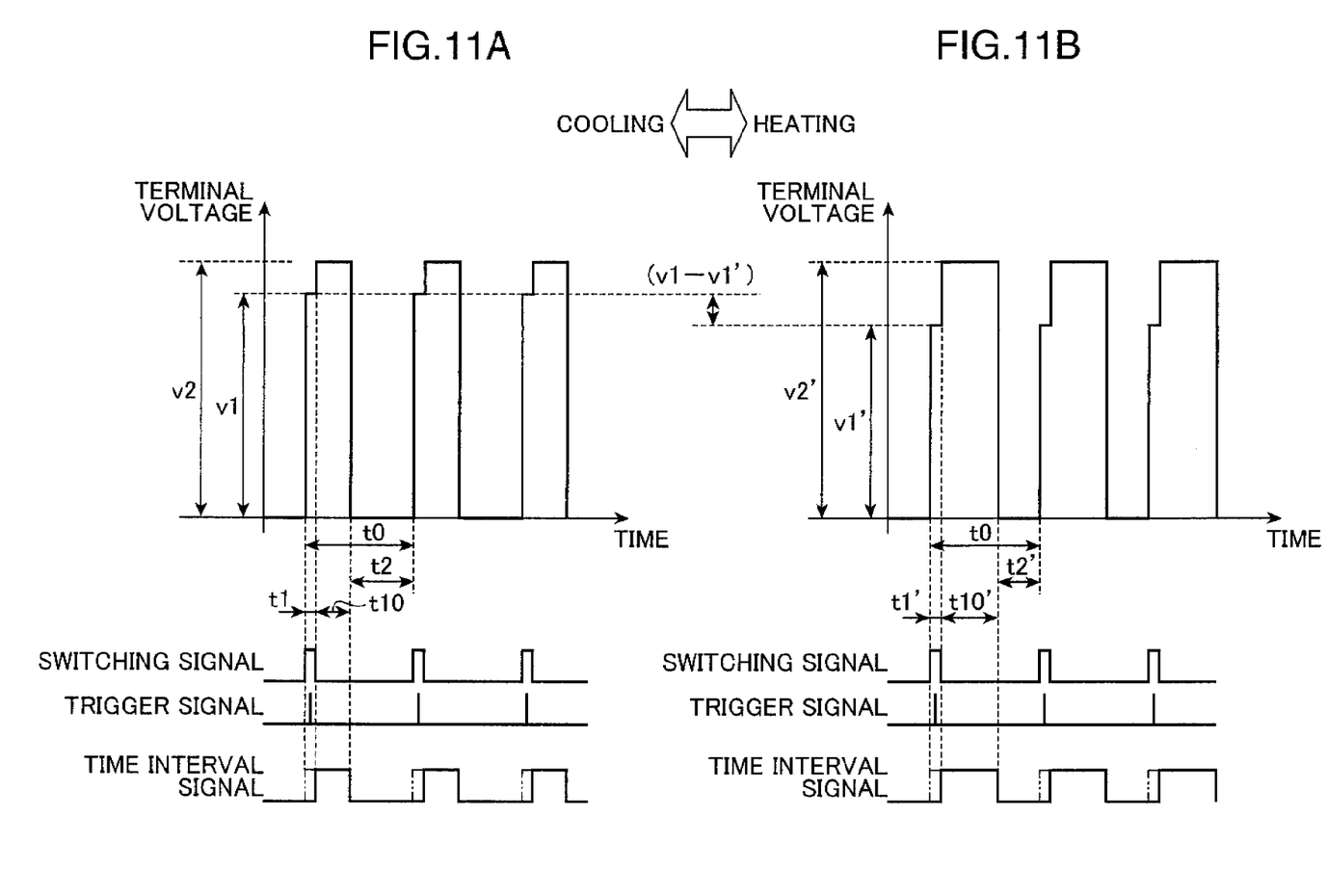
FIGS. 11A and 11B are waveform diagrams for describing an operation to be performed by the SMA actuator driving device shown in FIG. 10.

FIGS. 11A and 11B are waveform diagrams for describing an operation to be performed by the SMA actuator driving device 41 having the above arrangement. FIG. 11A shows a state corresponding to the state shown in FIG. 8A, 9A in cooling the SMA member 7. FIG. 11B shows a state corresponding to the state shown in FIG. 8B, 9B in heating the SMA member 7. Once the SMA actuator driving device 41 is activated at a predetermined cycle t0, the voltage-time interval changing circuit 49 outputs a switching signal to the switching element 36 to switch to the constant current source 20 for a time t1, t1'. During the time when the switching element 36 receives the switching signal to switch to the constant current source 20, the voltage-time interval changing circuit 49 outputs a trigger signal to a sample-and-hold circuit 16 to detect a terminal voltage of the SMA member 7.

Upon completion of detection of the terminal voltage of the SMA member 7, the voltage-time interval changing circuit 49 outputs a switching signal to the switching element 36 to switch to the drive current source 40, and also outputs a time-interval signal to the switching element 21 to turn on the switching element 21. Thereby, the switching element 21 is turned on for a time t10, t10'. Upon lapse of the time t10, t10', the switching element 21 is turned off. Thereby, the switching element 21 is turned off for an off-duty time t2, t2'. Since a drive current to be outputted from the drive current source 40 is outputted to the SMA member 7 by a switching operation of the switching element 36, as shown by the imaginary lines in FIGS. 11A and 11B, the time-interval signal for turning on the switching element 21 may be outputted at any timing during a time t1, t1'.

The above arrangement enables to fix the cycle t0 and the time t1, t1' when the constant current source 20 is driven. This enables to stabilize an operation status i.e. a load status of the constant current source 20. Also, the above arrangement enables to increase the value of a current to be outputted, without unduly increasing the output precision of a drive current to be outputted from the drive current source 40. This is advantageous in enhancing the utility efficiency of electric power. In other words, the above arrangement enables to suppress electric power consumption required for controlling displacement of the SMA member 7, without the need of a complex control on electric current value.

Fourth Embodiment

Figure 12:
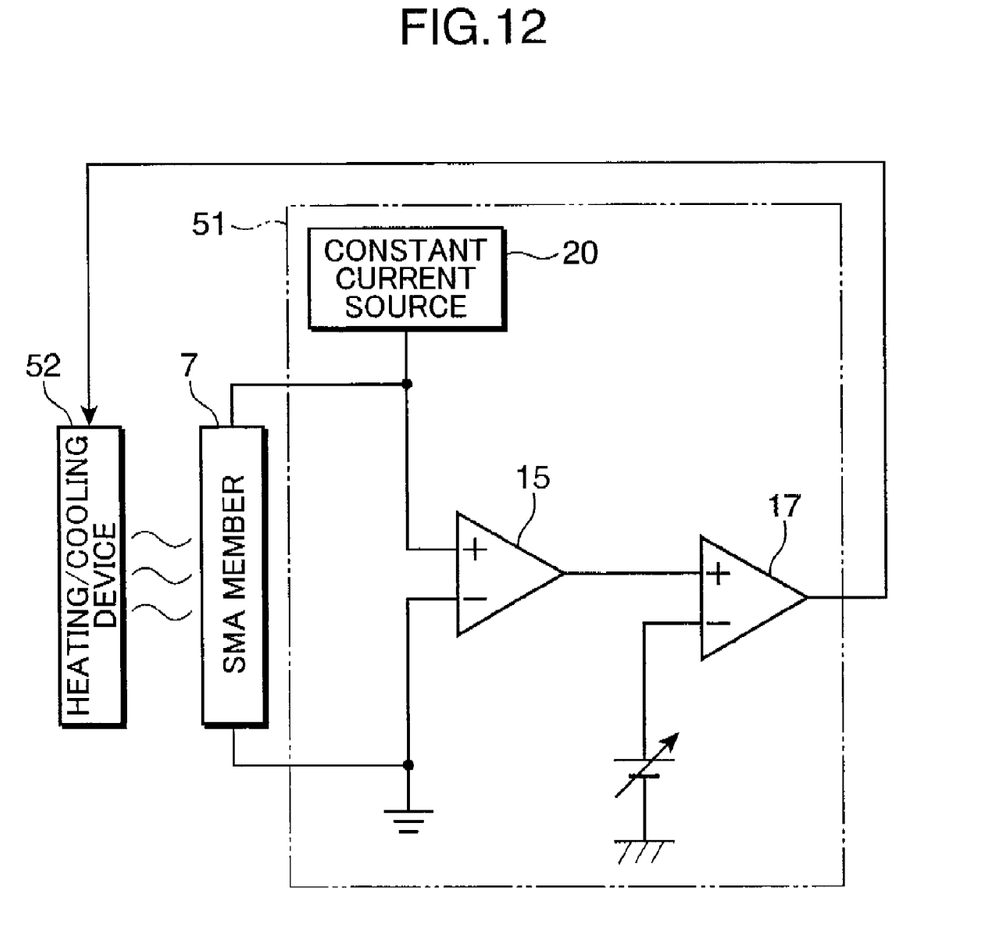
FIG. 12 is a block diagram showing an electrical configuration of an SMA actuator driving device in accordance with a fourth embodiment of the invention.

FIG. 12 is a block diagram showing an electrical configuration of an SMA actuator driving device 51 in accordance with the fourth embodiment of the invention. The arrangement of the SMA actuator driving device 51 in the fourth embodiment is similar to the arrangement of the SMA actuator driving device 11 in the first embodiment. Accordingly, elements of the SMA actuator driving device 51 substantially equivalent or corresponding to those of the SMA actuator driving device 11 are indicated with the same reference numerals, and description thereof is omitted herein. The SMA actuator driving device 51 has a feature that a drive current is applied to a heating/cooling device 52 i.e. a temperature changer as an independent element such as a Peltier element to expand and contract the SMA member 7 by heating and cooling the SMA member 7 with use of the heating/cooling device 52.

The Peltier element is provided in proximity to the linear SMA member 7. Preferably, the Peltier element is thermally insulated from the surroundings to efficiently transfer the heat of the Peltier element to the SMA member 7. A constant current source 20 in the SMA actuator driving device 51 sequentially outputs a retrieval signal. A servo amplifier 17 applies a drive current to the heating/cooling device 52 depending on a voltage difference between a terminal voltage "v", "v'" to be detected by an operational amplifier 15, and a target voltage. The above arrangement eliminates direct application of a drive current to the SMA member 7. In this embodiment, a retrieval signal is applied during application of a drive current. In the above arrangement, in the case where a current corresponding to a retrieval signal affects expansion or contraction of the SMA member 7, the value of the current may be decreased, or a switching element 21 for turning on and off application of a retrieval signal may be provided.

The specification discloses the aforementioned arrangements. The following is a summary of the primary arrangements of the embodiments.

According to an aspect of the invention, a shape memory alloy actuator driving device is a shape memory alloy actuator driving device for expanding and contracting a shape memory alloy member by increasing and decreasing a temperature of the shape memory alloy member through application and suspending application of a drive current from a driving circuit to the shape memory alloy member to displace a driven member linked to the shape memory alloy member to an intended position. The shape memory alloy actuator driving device comprises: a constant current source for applying a predetermined constant current to the shape memory alloy member, as a retrieval signal; a detector for detecting a voltage between terminals of the shape memory alloy member by the retrieval signal; and a controller for comparing a detection result of the detector, with a target voltage value to be calculated based on a target resistance value of the shape memory alloy member corresponding to the intended displaced position of the driven member, and a value of the constant current, and causing the driving circuit to output, to the shape memory alloy member, a drive current that makes the detection result substantially equal to the target voltage value. The retrieval signal is applied during application of the drive current, or applied with the drive current in time-series manner.

In the above arrangement, in a compact shape memory alloy actuator driving device to be used in e.g. driving a lens unit of a mobile phone, the shape memory alloy member is heated by direct application of the drive current from the driving circuit, and cooled by suspending application of the drive current; or heated and cooled by a temperature changer such as a Peltier element as an independent element by application and suspending application of the drive current to the temperature changer for expansion or contraction, whereby the driven member linked to the shape memory alloy member is displaced to the intended position. In the displacing operation, the controller is operable to detect a resistance value of the shape memory alloy member i.e. an expanded or contracted length of the shape memory alloy member, in other words, a displaced position of the driven member at a driving start timing or a predetermined time interval during the driving operation. In feedback-controlling the drive current by the driving circuit, the resistance value of the shape memory alloy member is detected by applying the predetermined constant current to be outputted from the constant current source, as the retrieval signal to the shape memory alloy member, and causing the detector to detect the terminal voltage of the shape memory alloy member.

In the above arrangement, there is no need of providing a high-precision resistor, which is required in using a Wheatstone bridge circuit, despite the need of a high-precision constant current source. The above arrangement enables to constitute the constant current source of a current mirror circuit or a like element, which is advantageous in fabricating the shape memory alloy actuator driving device into an integrated circuit, and suppressing an electric power loss.

Preferably, the driving circuit may include a switching element for switching on and off application of the current to be outputted from the constant current source, and the controller may cause the switching element to perform a duty control in such a manner that the detection result of the detector is substantially equal to the target voltage value, and causes the detector to detect the terminal voltage of the shape memory alloy member during an on-duty time of the switching element.

In the above arrangement, the constant current source for outputting the retrieval signal can be jointly used by the driving circuit for applying the drive current to the shape memory alloy member for expansion and contraction of the shape memory alloy member.

Preferably, the driving circuit may include a switching element for switching over between a current to be outputted from a variable current source in the driving circuit, and the retrieval signal to be outputted from the constant current source to apply the switched current to the shape memory alloy member, and the controller may control a value of the current to be outputted from the variable current source in such a manner that the detection result of the detector is substantially equal to the target voltage value, and cause the detector to detect the terminal voltage of the shape memory alloy member during a time when the switching element is switched to the constant current source.

In the above arrangement, controlling the constant current source to output the retrieval signal at a predetermined cycle by causing the switching element to cyclically perform a switching operation enables to stabilize an operation status of the constant current source.

Thereby, a terminal voltage of the shape memory alloy member i.e. a resistance value thereof can be detected with high precision. Also, the above arrangement enables to minimize a time required for detecting the terminal voltage, in other words, increase the ratio of a drive current application period with respect to each cycle, which is advantageous in enhancing responsiveness of the shape memory alloy member. Further, the above arrangement enables to properly set a minimum value of the drive current, and allow a minute displacement of the shape memory alloy member. Furthermore, as compared with a duty-controlled switching device, the above arrangement is advantageous in simplifying the arrangement of the driving circuit.

Preferably, the driving circuit may include a switching element for switching over between a current to be outputted from a variable current source in the driving circuit, and the retrieval signal to be outputted from the constant current source to apply the switched current to the shape memory alloy member, and the controller may control a value of the current to be outputted from the variable current source and a duty ratio of the switching element in such a manner that the detection result of the detector is substantially equal to the target voltage value, and cause the detector to detect the terminal voltage of the shape memory alloy member during a time when the switching element is switched to the constant current source.

The above arrangement enables to increase the magnitude of change of the drive current.

An image pickup device according to another aspect of the invention comprises the shape memory alloy actuator driving device having the above arrangement.

The above arrangement enables to realize an image pickup device incorporated with a compact driving device capable of suppressing an electric power loss.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A shape memory alloy actuator driving device for expanding and contracting a shape memory alloy member by increasing and decreasing a temperature of the shape memory alloy member through application and suspending application of a drive current from a driving circuit to the shape memory alloy member to displace a driven member linked to the shape memory alloy member to an intended position, the shape memory alloy actuator driving device comprising:
   a constant current source for applying a predetermined constant current to the shape memory alloy member, as a retrieval signal;
   a detector for detecting a voltage between terminals of the shape memory alloy member by the retrieval signal; and
   a controller for comparing a detection result of the detector, with a target voltage value to be calculated based on a target resistance value of the shape memory alloy member corresponding to the intended displaced position of the driven member, and a value of the constant current, and causing the driving circuit to output, to the shape memory alloy member, a drive current that makes the detection result substantially equal to the target voltage value, wherein
   the driving circuit includes a switching element for switching over between a current to be outputted from a variable current source in the driving circuit, and the retrieval signal to be outputted from the constant current source to apply the switched current to the shape memory alloy member, and
   the controller controls a value of the current to be outputted from the variable current source in such a manner that the detection result of the detector is substantially equal to the target voltage value, and causes the detector to detect the terminal voltage of the shape memory alloy member during a time when the switching element is switched to the constant current source.

2. A shape memory alloy actuator driving device for expanding and contracting a shape memory alloy member by increasing and decreasing a temperature of the shape memory alloy member through application and suspending application of a drive current from a driving circuit to the shape memory alloy member to displace a driven member linked to the shape memory alloy member to an intended position, the shape memory alloy actuator driving device comprising:
   a constant current source for applying a predetermined constant current to the shape memory alloy member, as a retrieval signal;
   a detector for detecting a voltage between terminals of the shape memory alloy member by the retrieval signal; and
   a controller for comparing a detection result of the detector, with a target voltage value to be calculated based on a target resistance value of the shape memory alloy member corresponding to the intended displaced position of the driven member, and a value of the constant current, and causing the driving circuit to output, to the shape memory alloy member, a drive current that makes the detection result substantially equal to the target voltage value, wherein
   the driving circuit includes a switching element for switching over between a current to be outputted from a variable current source in the driving circuit, and the retrieval signal to be outputted from the constant current source to apply the switched current to the shape memory alloy member, and
   the controller controls a value of the current to be outputted from the variable current source and a duty ratio of the switching element in such a manner that the detection result of the detector is substantially equal to the target voltage value, and causes the detector to detect the terminal voltage of the shape memory alloy member during a time when the switching element is switched to the constant current source.

3. An image pickup device, comprising:
   a shape memory alloy actuator driving device for expanding and contracting a shape memory alloy member by increasing and decreasing a temperature of the shape memory alloy member through application and suspending application of a drive current from a driving circuit to the shape memory alloy member to displace a driven member linked to the shape memory alloy member to an intended position, the shape memory alloy actuator driving device including:
   a constant current source for applying a predetermined constant current to the shape memory alloy member, as a retrieval signal;
   a detector for detecting a voltage between terminals of the shape memory alloy member by the retrieval signal; and
   a controller for feedback controlling the drive current by comparing each of a plurality of detection results of the detector taken during a driving operation, with a target voltage value to be calculated based on a target resistance value of the shape memory alloy member corresponding to the intended displaced position of the driven member, and a value of the constant current, and causing the driving circuit to output, to the shape memory alloy member, based on a result of a comparison for each of the plurality of detection results, a drive current that makes a subsequent detection result substantially equal to the target voltage value, following the detection of each of the plurality of detection results taken during the driving operation, wherein the driving circuit includes a switching element for switching over between a current to be outputted from a variable current source in the driving circuit, and the retrieval signal to be outputted from the constant current source to apply the switched current to the shape memory alloy member, and the controller controls a value of the current to be outputted from the variable current source in such a manner that the detection result of the detector is substantially equal to the target voltage value, and causes the detector to detect the terminal voltage of the shape memory alloy member during a time when the switching element is switched to the constant current source.

4. An image pickup device, comprising:
a shape memory alloy actuator driving device for expanding and contracting a shape memory alloy member by increasing and decreasing a temperature of the shape memory alloy member through application and suspending application of a drive current from a driving circuit to the shape memory alloy member to displace a driven member linked to the shape memory alloy member to an intended position, the shape memory alloy actuator driving device including:
a constant current source for applying a predetermined constant current to the shape memory alloy member, as a retrieval signal;
a detector for detecting a voltage between terminals of the shape memory alloy member by the retrieval signal; and
a controller for feedback controlling the drive current by comparing each of a plurality of detection results of the detector taken during a driving operation, with a target voltage value to be calculated based on a target resistance value of the shape memory alloy member corresponding to the intended displaced position of the driven member, and a value of the constant current, and causing the driving circuit to output, to the shape memory alloy member, based on a result of a comparison for each of the plurality of detection results, a drive current that makes a subsequent detection result substantially equal to the target voltage value, following the detection of each of the plurality of detection results taken during the driving operation, wherein
the driving circuit includes a switching element for switching over between a current to be outputted from a variable current source in the driving circuit, and the retrieval signal to be outputted from the constant current source, to apply the switched current to the shape memory alloy member, and
the controller controls a value of the current to be outputted from the variable current source and a duty ratio of the switching element in such a manner that the detection result of the detector is substantially equal to the target voltage value, and causes the detector to detect the terminal voltage of the shape memory alloy member during a time when the switching element is switched to the constant current source.

5. A shape memory alloy actuator driving device for expanding and contracting a shape memory alloy member by increasing and decreasing a temperature of the shape memory alloy member through application and suspending application of a drive current from a driving circuit to the shape memory alloy member to displace a driven member linked to the shape memory alloy member to an intended position, the shape memory alloy actuator driving device comprising:

a constant current source for applying a predetermined constant current to the shape memory alloy member, as a retrieval signal;
a detector for detecting a voltage between terminals of the shape memory alloy member by the retrieval signal; and
a controller for comparing a detection result of the detector, with a target voltage value to be calculated based on a target resistance value of the shape memory alloy member corresponding to the intended displaced position of the driven member, and a value of the constant current, and causing the driving circuit to output, to the shape memory alloy member, a drive current that makes the detection result substantially equal to the target voltage value, wherein
the controller controls a switching over between a current to be outputted from a variable current source in the driving circuit, and the retrieval signal to be outputted from the constant source, to apply the switched current to the shape memory alloy member, and
the controller controls a value of the current to be outputted from the variable current source in such a manner that the detection result of the detector is substantially equal to the target voltage value, and causes the detector to detect the terminal voltage of the shape memory alloy member during a time when the retrieval signal to be outputted from the constant current source is applied to the shape memory alloy member.

6. A shape memory alloy actuator driving device for expanding and contracting a shape memory alloy member by increasing and decreasing a temperature of the shape memory alloy member through application and suspending application of a drive current, the shape memory alloy actuator driving device comprising:
a driving circuit configured to apply a predetermined constant current to the shape memory alloy member, as a retrieval signal and to apply a variable current to the shape memory alloy member to displace a driven member, as a driven current, linked to the shape memory alloy member to an intended position;
a detector for detecting a voltage between terminals of the shape memory alloy member by the retrieval signal; and
a controller for comparing a detection result of the detector, with a target voltage value to be calculated based on a target resistance value of the shape memory alloy member corresponding to the intended displaced position of the driven member, and a value of the constant current, and causing the driving circuit to output, to the shape memory alloy member, a drive current that makes the detection result substantially equal to the target voltage value, wherein
the controller controls a switching over between the variable current and the retrieval signal to be outputted from the driving circuit, to apply the switched current to the shape memory alloy member, and
the controller controls a value of the variable current to be outputted from the driving circuit in such a manner that the detection result of the detector is substantially equal to the target voltage value, and causes the detector to detect the terminal voltage of the shape memory alloy member when the retrieval signal is applied to the shape memory alloy member.

* * * * *